United States Patent [19]

Poehlman

[11] 4,322,935
[45] Apr. 6, 1982

[54] LAWN MOWER INCLUDING A SAFETY CLUTCH AND BRAKE

[75] Inventor: Arthur G. Poehlman, West Bend, Wis.

[73] Assignee: Outboard Marine Corporation, Waukegan, Ill.

[21] Appl. No.: 185,332

[22] Filed: Sep. 8, 1980

[51] Int. Cl.³ ............................................. A01D 35/26
[52] U.S. Cl. ................................... 56/11.3; 192/18 R
[58] Field of Search ............. 56/11.3; 192/18 R, 14 R, 192/89 B; 74/97, 100 R, 100 P

[56] References Cited

U.S. PATENT DOCUMENTS

| | | | |
|---|---|---|---|
| 2,750,463 | 6/1956 | Roeser | 74/100 P |
| 3,386,545 | 6/1968 | Hansen | 192/18 R |
| 3,871,159 | 3/1975 | Shriver | 56/11.3 |
| 4,041,679 | 8/1977 | Seifert et al. | 56/11.3 |
| 4,105,041 | 8/1978 | Axthammer | 74/100 P |
| 4,205,509 | 6/1980 | Miyazawa et al. | 56/11.3 |

*Primary Examiner*—Robert A. Hafer
*Attorney, Agent, or Firm*—Michael, Best & Friedrich

[57] ABSTRACT

The invention includes a combined clutch and brake mechanism for use in lawn mowers and other machines having a cutting means driven by a rotatably driven drive shaft. The combined clutch and brake mechanism includes a clutch member driven by the drive shaft. A brake member is spaced from the clutch member and is fixedly connected to the housing. A drive member is disposed between the clutch member and the brake member and is movable between a drive position wherein the drive member frictionally engages the clutch member and is rotatably driven by the clutch member and a brake position wherein the drive member frictionally engages the brake member and is restrained against movement. A linkage is provided for selectively moving the drive member between the drive position and the brake position. A Belleville spring is also provided for forcing the drive member toward the drive position when the drive member is moved from the brake position toward the clutch member and past a position intermediate the drive position and the brake position, and for forcing the drive member toward the brake member when the drive member is moved from the drive position toward the brake position and past the intermediate position.

23 Claims, 5 Drawing Figures

U.S. Patent  Apr. 6, 1982  4,322,935
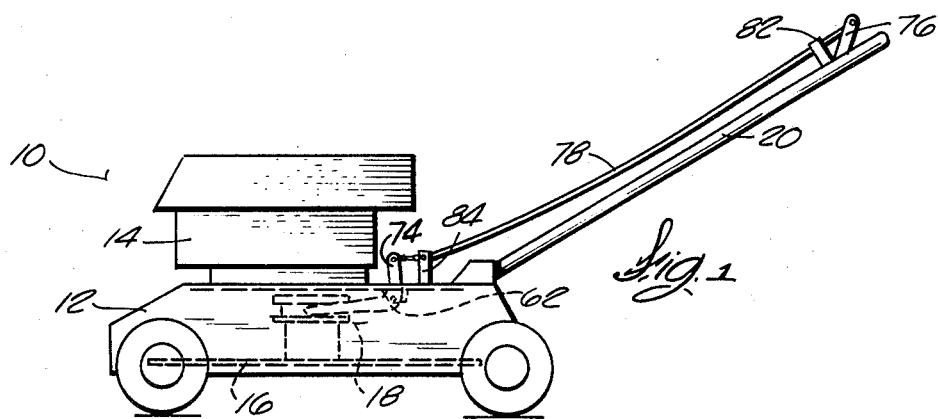
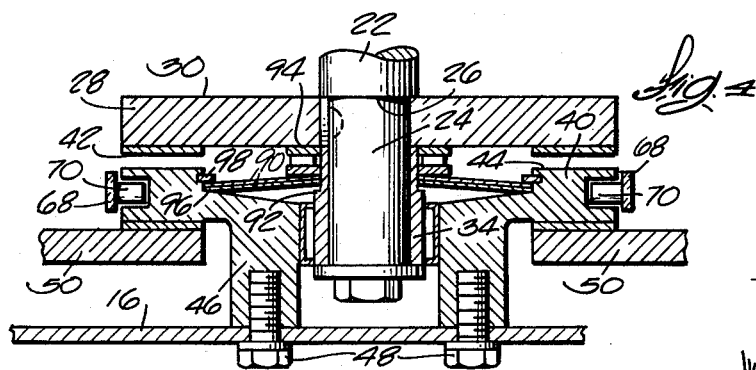
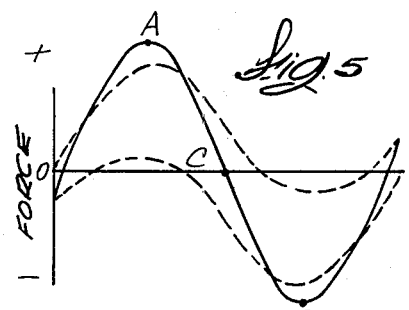
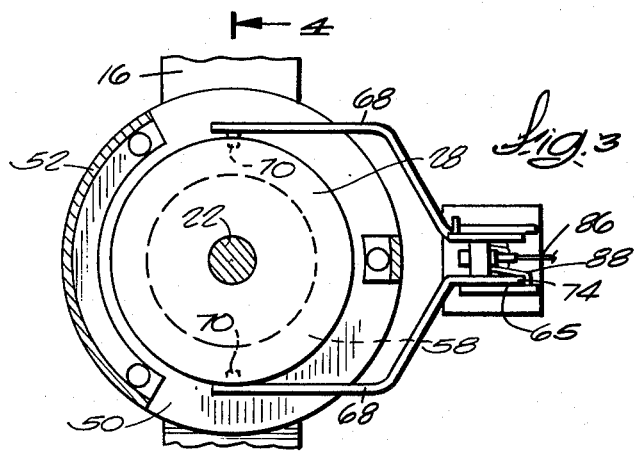
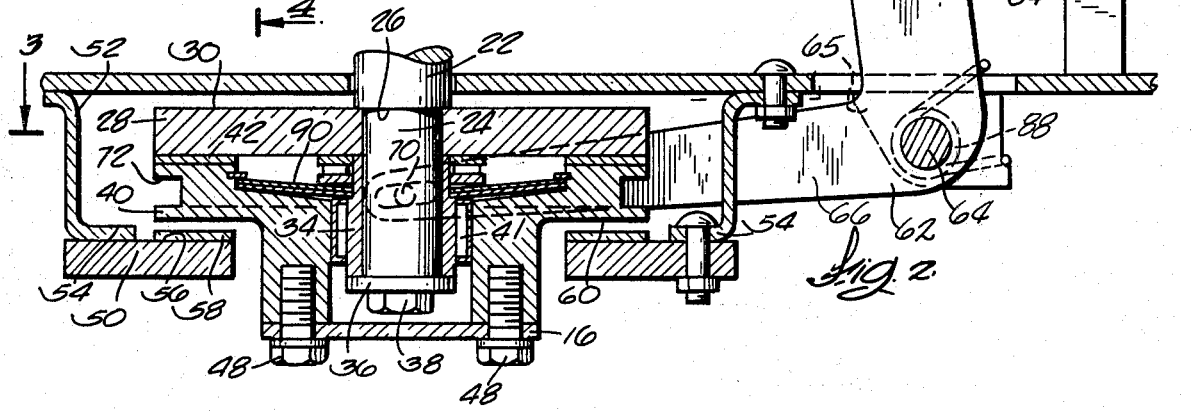

LAWN MOWER INCLUDING A SAFETY CLUTCH AND BRAKE

FIELD OF THE INVENTION

The invention relates generally to machines such as lawn mowers and other machines including a rotary blade or a cutting mechanism driven by a rotary drive shaft, and more particularly to machines such as rotary lawn mowers including a clutch operable to engage and disengage a rotary cutting member with respect to a prime mover. The invention further relates to such machines in which the cutting member rotation is braked incident to disengagement of the clutch.

BACKGROUND PRIOR ART

Particular attention is directed to the U.S. Holtermann Pat. No. 4,122,652 and the U.S. Poehlman Pat. No. 4,053,980, each of those patents being assigned to the assignee of the present invention.

Attention is also directed to the U.S. Tombers Pat. No. 3,967,438; the U.S. Zurek Pat. No. 3,908,344; the U.S. Zurek Pat. No. 3,897,678; and the U.S. Shriver Pat. No. 3,871,159.

Attention is further directed to the U.S. Dowdle Pat. No. 2,985,992; the U.S. Meylink Pat. No. 3,613,815; and the U.S. Kamlukin Pat. No. 3,731,472.

Attention is also directed to the U.S. Hansen Pat. No. 3,386,545; the U.S. Culbertson Pat. No. 3,841,453; and the U.S. Carlson Pat. No. 2,366,594.

SUMMARY OF THE INVENTION

The invention includes a lawn mower having a housing, an engine supported by the housing, a drive shaft driven by the engine, and a clutch member driven by the drive shaft. A brake member is spaced from the clutch member and fixedly connected to the housing, and a drive member is disposed between the clutch member and the brake member. The drive member is supported so as to be movable between a drive position wherein the drive member frictionally engages the clutch member and is rotatably driven by the clutch member and a brake position wherein the drive member frictionally engages the brake member and is restrained against movement. A cutter blade is connected to the drive member and is rotatably driven by the drive member. Means are also provided for selectively moving the drive member between the drive position and the brake position. The invention further includes spring means for forcing the drive member toward the drive position when the drive member is moved from the brake position toward the clutch member and past a position intermediate the drive position and the brake position, and for forcing the drive member toward the brake member when the drive member is moved from the drive position toward the brake position and past the intermediate position.

The invention further includes a lawn mower having a housing, an engine supported by the housing, a drive shaft driven by the engine, and a clutch member driven by the drive shaft. A brake member is spaced from the clutch member and fixedly connected to the housing, and a drive member is disposed between the clutch member and the brake member. The drive member is supported so as to be movable between a drive position wherein the drive member frictionally engages the clutch member and is rotatably driven by the clutch member and a brake position wherein the drive member frictionally engages the brake member and is restrained against movement. A cutter blade is connected to the drive member and is rotatably driven by the drive member. Means are also provided for selectively moving the drive member between the drive position and the brake position. The invention also includes means for forcing the drive member toward the drive position when the drive member is moved from the brake position toward the clutch member and past a position intermediate the drive position and the brake position, and for forcing the drive member toward the brake member when the drive member is moved from the drive position toward the brake position and past the intermediate position. The forcing means includes a resilient element interacting with the drive member and including a portion being movable between the drive position, wherein the resilient element portion yieldably resists movement of the drive member away from the clutch member, and the brake position, wherein the resilient element portion yieldably resists movement of the drive member away from the brake member.

The invention also includes a lawn mower having a housing, an engine supported by the housing, a drive shaft rotatably driven by the engine about an axis, and a clutch disc rotatably driven by the drive shaft, the clutch disc having a surface transverse to the axis. A brake disc is spaced from the clutch disc and is fixedly connected to the housing, the brake disc having a surface generally parallel to the clutch disc surface. A drive plate is disposed between the clutch disc and the brake disc and is movable between a drive position wherein the drive plate frictionally engages the clutch disc surface and is rotatably driven by the clutch disc, and a brake position wherein the drive plate frictionally engages the brake disc surface and is restrained against movement. A cutter blade is connected to the drive plate and is driven by the drive plate. Means are also provided for selectively moving the drive plate between the drive position and the brake position. The invention further includes spring means for forcing the drive plate toward the drive position when the drive plate is moved from the brake position toward the drive plate and past a position intermediate the drive position and the brake position and for forcing the drive plate toward the brake disc when the drive plate is moved from the drive position toward the brake position and past the intermediate position.

In accordance with one embodiment of the invention the spring means comprises at least one Belleville spring surrounding a portion of the drive shaft, the Belleville spring including a central portion fixed against axial movement and a peripheral portion engaging the drive plate and movable axially with the drive plate.

In accordance with one embodiment of the invention the lawn mower further includes means for drivingly connecting the cutter blade and the drive member, that connecting means including a hub surrounding a portion of the drive shaft and integrally connected to the drive member so as to be rotatably driven by the drive member, and the cutter blade is fixed to the hub.

In accordance with one embodiment of the invention the means for selectively moving the drive member includes a lever arm having an end carrying the drive member and an opposite end supported by the housing for pivotal movement, and means for selectively causing pivotal movement of the lever arm.

In accordance with one embodiment of the invention, the lawn mower includes a second spring means for biasing the lever arm in a direction which causes the drive member to move toward the brake disc, the second spring means being operable to overpower the force of the first spring means and to bias the drive member into engagement with the brake disc.

In accordance with one embodiment of the invention the lawn mower includes a handle for steering movement of the lawn mower, an operating lever mounted on the handle for movement between a first lever position spaced from the handle, and a second lever position adjacent to the handle, a linkage connecting the operating lever with the drive member to locate the drive member in the brake position when the lever is in the first lever position and to locate the drive member in the drive position when the lever is in the second lever position, and second spring means for biasing at least one of the drive member and the operating lever toward the brake position and so as to overpower the first spring means.

The invention also includes a combined clutch and brake mechanism including a clutch disc mounted for rotation about an axis and having a surface transverse to the axis, a brake disc spaced from the clutch disc and fixed against movement, the brake disc having a surface generally parallel to the clutch disc surface. The combined clutch and brake mechanism also includes a drive plate disposed between the clutch disc and the brake disc and being movable between a drive position wherein the drive plate frictionally engages the clutch disc surface and is rotatably driven by the clutch disc, and a brake position wherein the drive plate frictionally engages the brake disc surface and is restrained against movement. Also included are means for selectively moving the drive plate between the drive position and the brake position, and spring means for forcing the drive plate toward the drive position when the drive plate is moved from the brake position toward the drive plate and past a position intermediate the drive position and the brake position and for forcing the drive plate toward the brake disc when the drive plate is moved from the drive position toward the brake position and past the intermediate position.

Various other features and advantages of the invention are set forth in the following description of a preferred embodiment, in the claims, and in the drawings.

BRIEF DESCRIPTION OF THE DRAWINGS

FIG. 1 is a schematic side elevation view of a lawn mower incorporating various features of the invention.

FIG. 2 is an enlarged view, partially broken away and in section, of a combined clutch and brake mechanism incorporated in the lawn mower shown in FIG. 1.

FIG. 3 is a reduced cross section view taken along line 3—3 in FIG. 2.

FIG. 4 is an enlarged cross secion view taken along line 4—4 in FIG. 3.

FIG. 5 is a graph illustrating the force characteristics of Belleville springs employed in the clutch and brake mechanism.

Before describing a preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

DESCRIPTION OF A PREFERRED EMBODIMENT

Shown in the drawings is a lawn mower 10 including a blade housing 12 supporting a prime mover 14 which drives a cutter blade 16. The blade housing 12 can be suitably supported for travel over the ground in any manner, and can be guided for travel over the ground by a suitable handle 20 or other steering mechanism.

More particularly, the prime mover 14 can be either an internal combustion engine or an electric motor adapted to cause rotation of an output or drive shaft 22 or an alternative drive member including a lower end portion 24 extending from a shoulder 26 and adapted to support and drive the rotary cutter blade 16.

Further included are clutch and brake means 18 for providing a selective driving connection between the drive shaft 22 and the cutter blade 16 such that the cutter blade 16 can be selectively driven by the drive shaft 22 and such that the driving connection between the cutter blade 16 and the drive shaft 22 can be interrupted. While the clutch and brake means 18 can have various constructions, in the particular arrangement illustrated, a rotatable clutch disc or clutch member 28 is keyed to the drive shaft 22 and includes an upper surface 30 engaging the shoulder 26 of the drive shaft 22. The clutch disc 28 is supported by a spacer sleeve 34 surrounding the downwardly extending end 24 of the drive shaft, the spacer sleeve 34 being supported by a washer 36 and a bolt 38.

The clutch and brake means 18 further includes a drive plate or drive member 40 surrounding the lower end 24 of the drive shaft 22 and being freely rotatable with respect to the drive shaft 22. The drive plate 40 is supported for rotation around the spacer sleeve 34 by a bearing 41 and is also supported so as to be movable from a position spaced from the clutch disc 28, wherein the drive shaft 22 and clutch disc 28 rotate with respect to the drive plate 40, to a position in face-to-face engagement with the clutch disc 28. In the illustrated embodiment of the invention, the lower planar surface of the clutch disc 28 is parallel to an opposing upper surface 44 of the drive plate 40 and supports a clutch pad 42. The planar upper surface 44 of the drive plate 40 is adapted to engage the clutch pad 42 in face-to-face frictional engagement whereby the drive plate 40 will be rotatably driven with the clutch disc 28.

The drive plate 40 also includes means for supporting and driving the mower cutter blade 16. In the illustrated construction, the drive plate includes a hub portion 46 integral therewith and surrounding the spacer sleeve 34. The lower end of the hub portion 46 extends axially downwardly beyond the end 24 of the drive shaft and the cutter blade 16 is secured thereto by bolts 48.

The clutch and brake means 18 further includes means for braking the drive plate 40 and the cutter blade 16 when the drive plate 40 is moved away from driving engagement with the clutch disc 28. In the illustrated construction, this braking means includes a brake disc or brake member 50 fixedly supported by the housing 12 in parallel spaced relation with respect to the clutch disc 28, and in parallel relation to the drive plate 40. While the brake disc supporting means can have various constructions, in the illustrated arrangement the supporting means includes a circular housing portion 52 extending downwardly from the blade housing 12. The housing portion 52 surrounds the clutch disc 28 and the drive plate 40 and includes an inwardly extending flange 54 supporting the brake disc 50. The brake disc is spaced from the clutch disc 28 by a space sufficient to permit the drive plate 40 to be housed therebetween and to be movable through a limited range of movement.

The upper surface 56 of the brake disc supports a brake pad 58 particularly adapted to be engaged by the peripheral planar lower surface 60 of the drive plate 40 and to brake the rotation of the drive plate when the drive plate is moved into frictional engagement with the brake disc.

Means are also provided for selectively moving the drive plate 40 between a position wherein it engages the clutch disc 28 and a position wherein it engages the brake disc 50. While various means can be provided, in the illustrated construction, such means comprises a bellcrank or double ended lever 62 which is pivotally supported by a pivot shaft 64 in turn supported by a bracket 65 and the blade housing 12. The lever 62 includes a forked part 66 having two spaced legs 68 (FIG. 3) located laterally outwardly of the drive plate 40. The ends of the legs 68 support members 70 which are received in a groove 72 around the circumferential surface of the drive plate 40. The double ended lever 62 also includes a lever arm portion 74 extending upwardly from the pivot shaft 64.

It will be readily understood that pivotal movement of the double ended lever 62 in a clockwise direction as seen in FIGS. 2 and 4 about pivot shaft 64 will result in movement of the drive plate 40 into engagement with the clutch disc 28, and movement of the lever 62 in a counterclockwise direction results in movement of the drive plate 40 into engagement with the brake disc 50.

The means for displacing the drive plate 40 also includes an operating lever 76 which is mounted on a portion of the handle 20 and which is movable between a position adjacent to the handle 20 and a position spaced from the handle. In addition, the means for displacing the drive plate 40 includes a linkage connecting the operating lever 76 and the lever 64 such that the lever 64 is in the position locating the drive plate 40 in the raised position, wherein the drive plate engages the clutch disc 28, when the operating lever 76 is adjacent the handle portion 20 and such that the lever 64 is positioned to locate the drive plate 40 in the lower position and in engagement with the brake disc 50 when the operating lever 76 is spaced from the handle 20. In the illustrated construction, the linkage includes a push-pull cable 78 having an outer sleeve 80 (FIG. 2). One end of the sleeve 80 is secured by a bracket member 82 to the handle 20 and an opposite end is secured by a bracket 84 to the blade housing 12. The core 86 of the push-pull cable 78 is connected at one end to the operating lever 76 and at its other end to the upwardly extending end of the lever arm portion 74.

Means are also provided for biasing the drive plate 40 toward the brake disc 50. While various arrangements can be provided, in the illustrated construction, such biasing means comprises a torsion spring 88 surrounding the pivot shaft 64 and biasing the lever 62 for movement in the counterclockwise direction as seen in FIG. 2.

Means are further provided for biasing the drive plate 40 toward the clutch disc 28 when the drive plate is moved past an intermediate position toward the clutch disc and for biasing the drive plate toward the brake disc 50 when the drive plate is moved past the intermediate position toward the brake disc. In the illustrated construction the biasing means comprises a resilient element and more particularly a pair of Belleville springs 90 placed in back-to-back relation and surrounding the spacer sleeve 34. The Belleville springs 90 are retained in place between a shoulder 92 of the spacer sleeve 34 and a thrust bearing 94. The thrust bearing 94 in turn engages the lower surface of the clutch disc 28. The outer periphery of the Belleville springs 90 is fixed to the drive plate 40 between a shoulder 96 of the drive plate and a snap ring 98 housed in a groove in the drive plate.

In operation, when the drive plate 40 is moved from the brake disc engaging position toward the clutch plate, as the drive plate moves past an intermediate position, the Belleville springs 90 apply a force on the drive plate biasing it into engagement with the clutch disc and yieldably resist movement of the drive plate away from the clutch plate. Similarly, when the drive plate 40 moves from a position adjacent the clutch plate past the intermediate position toward the brake disc 50, the Belleville springs then apply a force on the drive plate 40 causing it to engage the brake disc and yieldably resist movement of the drive plate away from the brake disc. As will be appreciated by those skilled in the art, the control linkage only has to cause movement of the drive plate 40 through a short range of travel in order to cause the drive plate to move through the intermediate position and to thereby effect shifting of the drive plate 40 from a clutch disc engaging position to a brake disc engaging position. The Belleville springs thus provide a strong reversal in force even though the drive plate may move through only a short distance on either side of the intermediate position.

Referring more particularly to the resilient characteristics of the Belleville springs 90, when assembled in back-to-back relationship in the manner illustrated, they provide force and deflection characteristics such as illustrated in the graph of FIG. 5 wherein the abscissa represents the degree of movement of the peripheral edges of the springs 90 (axial deflection) and the ordinate represents the axial force applied on the springs 90 to achieve the corresponding deflection. Referring to FIG. 5, point A represents the axial position of the periphery of the Belleville springs when the drive plate 40 engages the clutch disc 28, and point B indicates the axial force of the Belleville springs on the drive plate 40 when the drive plate engages the brake disc 50. Point C indicates the position where the drive plate is at the intermediate position between the clutch disc 28 and the brake disc 50 and wherein the force of the Belleville springs on the drive plate 40 is zero. It will be noted that when the drive plate is shifted only a short distance from the intermediate position C in either direction the force applied by the Belleville springs 90 on the drive plate 40 will increase markedly.

FIG. 5 also notes one of the advantages of the present invention which arises from the employment of a pair of Belleville springs in back-to-back relationship. The broken lines in FIG. 5 indicate force-deflection characteristic of the Belleville springs when employed individually. It will be noted that when the position of an individual Belleville spring is reversed the force characteristics or spring characteristics of the individual Belleville spring in one direction are not equivalent to those in an opposite direction. By employing a pair of Belleville springs in back-to-back relation, the resultant force characteristics approximate the sum of the force characteristics of the two springs and thereby provide equal forces on the drive plate 40 when deflected toward the clutch disc 28 as when deflected toward the brake disc 50.

The size and thickness of the Belleville washers can be selected in accordance with the desired force on the drive plate. The torsion spring 88 should be selected so as to have a size sufficient to override the force of the Belleville springs 90 and to cause the drive plate 40 to be moved from the clutch disc engaging position to a brake disc engaging position in the event the operator releases his grip on the operating lever 76. This provides a "dead man" control causing the blade 16 to be braked whenever the operator releases the operating lever 76.

While the clutching and braking mechanism has been described in connection with the cutter blade of a rotary lawn mower, it should be understood that the clutching and braking mechanism could also be used in connection with clutching and braking the chain sprocket of a chain saw and in other similar applications.

Various features of the invention are set forth in the following claims.

I claim:

1. A lawn mower comprising a housing, an engine supported by said housing, a drive shaft driven by said engine, a clutch member driven by said drive shaft, a brake member spaced from said clutch member and fixedly connected to said housing, a drive member disposed between said clutch member and said brake member and movable between a drive position wherein said drive member frictionally engages said clutch member and is rotatably driven by said clutch member and a brake position wherein said drive member frictionally engages said brake member and is restrained against movement, a cutter blade connected to said drive member and rotatably driven by said drive member, means for selectively moving said drive member between said drive position and said brake position, and first spring means for forcing said drive member toward said drive position when said drive member is moved from said brake position toward said clutch member and past a position intermediate said drive position and said brake position, and for forcing said drive member toward said brake member when said drive member is moved from said drive position toward said brake position and past said intermediate position.

2. A lawn mower as set forth in claim 1 wherein said spring means comprises at least one Belleville spring surrounding a portion of said drive shaft, said Belleville spring including a central portion fixed against axial movement and a peripheral portion engaging said drive member and movable axially with said drive member.

3. A lawn mower as set forth in claim 1 and further including means for drivingly connecting said cutter blade and said drive member, said means including a hub surrounding a portion of said drive shaft and integrally connected to said drive member so as to be rotatably driven by said drive member, said cutter blade being fixed to said hub.

4. A lawn mower as set forth in claim 1 wherein said means for selectively moving said drive member includes a lever arm having an end engaged with said drive member and an opposite end supported by said housing for pivotal movement, and means for selectively causing pivotal movement of said lever arm.

5. A lawn mower as set forth in claim 4 and further including second spring means for biasing said lever arm in a direction which causes said drive member to move toward said brake disc.

6. A lawn mower as set forth in claim 5 wherein said second spring means overcomes the force of said first spring means to bias said drive member into engagement with said brake disc.

7. A lawn mower as set forth in claim 1 and further including a handle for steering movement of said lawn mower, an operating lever mounted on said handle for movement between a first lever position spaced from said handle, and a second lever position adjacent to said handle, a linkage connecting said operating lever with said drive member to locate said drive member in said brake position when said lever is in said first lever position and to locate said drive member in said drive position when said lever is in said second lever position.

8. A lawn mower as set forth in claim 7 and further including second spring means for biasing at least one of said drive member and said operating lever toward said brake position and so as to overpower said first spring means.

9. A lawn mower comprising a housing, an engine supported by said housing, a drive shaft driven by said engine, a clutch member driven by said drive shaft, a brake member spaced from said clutch member and fixedly connected to said housing, a drive member disposed between said clutch member and said brake member and movable between a drive position wherein said drive member frictionally engages said clutch member and is rotatably driven by said clutch member and a brake position wherein said drive member frictionally engages said brake member and is restrained against movement, a cutter blade connected to said drive member and rotatably driven by said drive member, means for selectively moving said drive member between said drive position and said brake position, and means for forcing said drive member toward said drive position when said drive member is moved from said brake position toward said clutch member and past a position intermediate said drive position and said brake position, and for forcing said drive member toward said brake member when said drive member is moved from said drive position toward said brake position and past said intermediate position, said forcing means including a resilient element interacting with said drive member and including a portion being movable between said drive position, wherein said portion yieldably resists movement of said drive member away from said clutch member, and said brake position, wherein said portion yieldably resists movement of said drive member away from said brake member.

10. A lawn mower as set forth in claim 9 wherein said resilient element comprises at least one Belleville spring surrounding a portion of said drive shaft, said Belleville spring including a central portion fixed against axial movement and wherein said resilient element portion comprises a peripheral portion of said Belleville spring engaging said drive member and movable with said drive member.

11. A lawn mower as set forth in claim 9 and further including means for drivingly connecting said cutter blade and said drive member, said means including a hub surrounding a portion of said drive shaft and integrally connected to said drive member so as to be rotatably driven by said drive member, said cutter blade being fixed to said hub.

12. A lawn mower as set forth in claim 9 and further including a handle for steering movement of said lawn mower, an operating lever mounted on said handle for movement between a first lever position spaced from said handle, and a second lever position adjacent to said handle, a linkage connecting said operating lever with said drive member to locate said drive member in said brake position when said operating lever is in said first lever position and to locate said drive member in said drive position when said lever is in said second lever position.

13. A lawn mower as set forth in claim 12 and further including second resilient means for biasing at least one of said drive member and said operating lever toward said brake position and so as to overpower said first resilient element.

14. A lawn mower comprising a housing, an engine supported by said housing, a drive shaft rotatably driven by said engine about an axis, a clutch disc rotatably driven by said drive shaft, said clutch disc having a surface transverse to said axis, a brake disc spaced from said clutch disc and fixedly connected to said housing, said brake disc having a surface generally parallel to said clutch disc surface, a drive plate disposed between said clutch disc and said brake disc and movable between a drive position wherein said drive plate frictionally engages said clutch disc surface and is rotatably driven by said clutch disc, and a brake position wherein said drive plate frictionally engages said brake disc surface and is restrained against movement, a cutter blade connected to said drive plate and driven by said drive plate, means for selectively moving said drive plate between said drive position and said brake position, and spring means for forcing said drive plate toward said drive position when said drive plate is moved from said brake position toward said drive plate and past a position intermediate said drive position and said brake position and for forcing said drive plate toward said brake disc when said drive plate is moved from said drive position toward said brake position and past said intermediate position.

15. A lawn mower as set forth in claim 14 wherein said spring means comprises at least one Belleville spring surrounding a portion of said drive shaft, said Belleville spring including a central portion fixed against axial movement and a peripheral portion engaging said drive plate and movable axially with said drive plate.

16. A lawn mower as set forth in claim 14 and further including means for drivingly connecting said cutter blade and said drive member, said means including a hub surrounding a portion of said drive shaft and integrally connected to said drive plate so as to be driven by said drive member, said cutter blade being fixed to said hub.

17. A lawn mower as set forth in claim 14 wherein said means for selectively moving said drive plate includes a lever arm having an end engaged with said drive plate and an opposite end supported by said housing for pivotal movement, and means for selectively causing pivotal movement of said lever arm.

18. A lawn mower as set forth in claim 17 and further including means for biasing said first lever arm in a direction which causes said drive plate to move toward said brake disc, said biasing means operating so as to overpower the force of said first spring means and to bias said drive plate into engagement with brake disc.

19. A lawn mower as set forth in claim 14 and further including a handle for steering movement of said lawn mower, an operating lever mounted on said handle for movement between a first lever position spaced from said handle, and a second lever position adjacent to said handle, a linkage connecting said operating lever with said drive plate to locate said drive plate in said brake position when said lever is in said first lever position and to locate said drive plate in said drive position when said lever is in said second lever position.

20. A lawn mower as set forth in claim 19 and further including second means for biasing at least one of said drive plate and said operating lever toward said brake position and so as to overpower said first biasing means.

21. A combined clutch and brake mechanism comprising a clutch disc mounted for rotation about an axis and having a surface transverse to said axis, a brake disc spaced from said clutch disc and fixed against movement, said brake disc having a surface generally parallel to said clutch disc surface, a drive plate disposed between said clutch disc and said brake disc and movable between a drive position wherein said drive plate frictionally engages said clutch disc surface and is rotatably driven by said clutch disc, and a brake position wherein said drive plate frictionally engages said brake disc surface and is restrained against movement, means for selectively moving said drive plate between said drive position and said brake position, and spring means for forcing said drive plate toward said drive position when said drive plate is moved from said brake position toward said drive plate and past a position intermediate said drive position and said brake position and for forcing said drive plate toward said brake disc when said drive plate is moved from said drive position toward said brake position and past said intermediate position.

22. A combined clutch and brake mechanism as set forth in claim 21 wherein said spring means comprises at least one Belleville spring including a central portion fixed against axial movement and a peripheral portion engaging said drive plate and movable axially with said drive plate.

23. A combined clutch and brake mechanism as set forth in claim 21 wherein said spring means comprises a pair of Belleville springs in back-to-back relation.

* * * * *